July 11, 1961
W. A. RAY
2,991,631
REVERSE CYCLE REFRIGERATION SYSTEM AND
FOUR-WAY TRANSFER VALVE FOR SAME
Filed Aug. 24, 1959
3 Sheets-Sheet 3
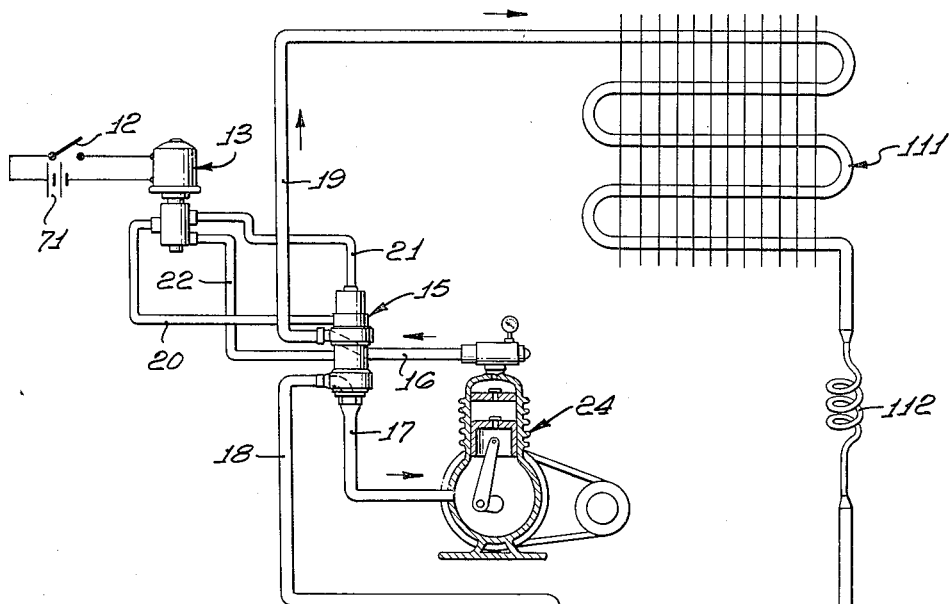
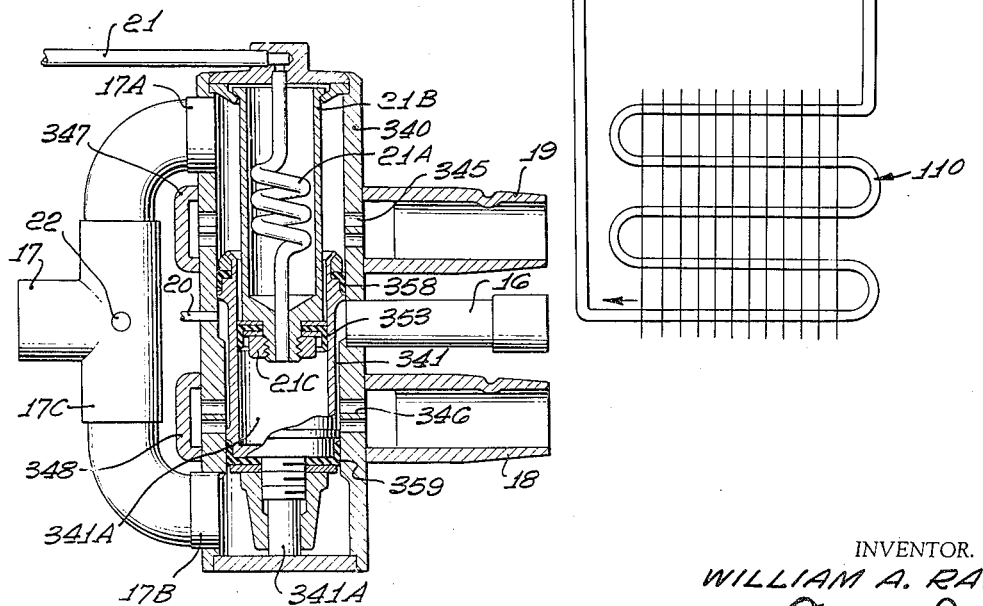
INVENTOR.
WILLIAM A. RAY
BY Lyon & Lyon
ATTORNEYS.

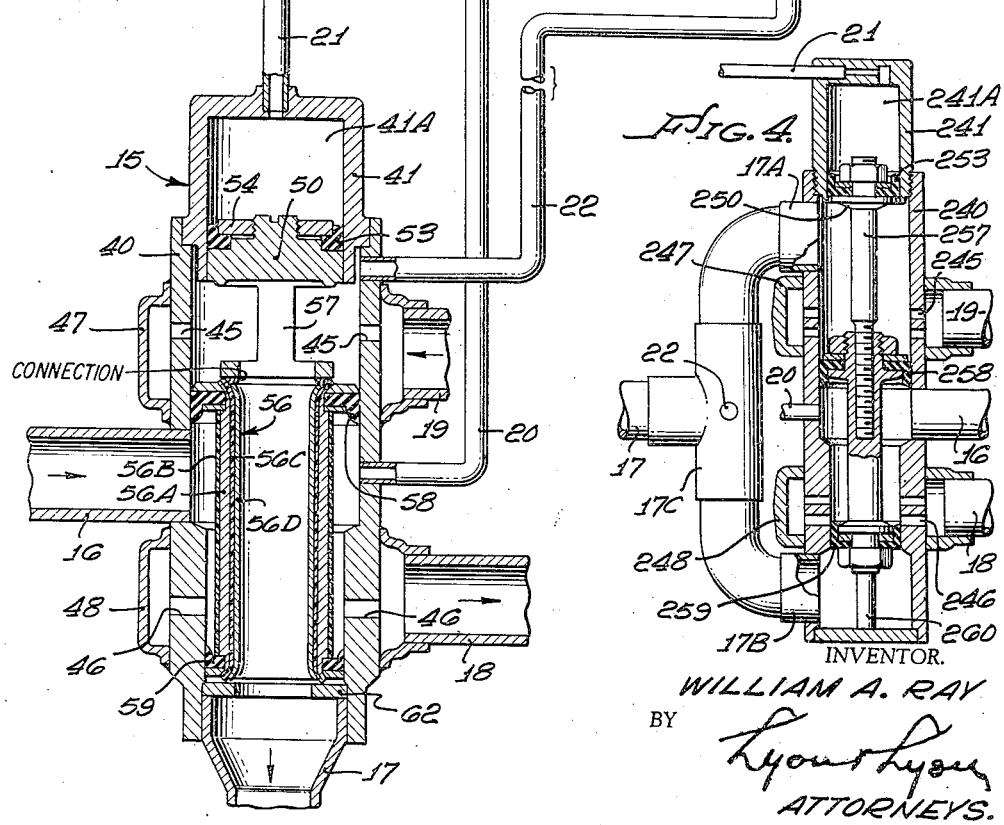

United States Patent Office 2,991,631
Patented July 11, 1961

2,991,631
REVERSE CYCLE REFRIGERATION SYSTEM AND FOUR-WAY TRANSFER VALVE FOR SAME
William A. Ray, North Hollywood, Calif., assignor to General Controls Co., Glendale, Calif., a corporation of California
Filed Aug. 24, 1959, Ser. No. 835,487
14 Claims. (Cl. 62—324)

The present invention relates to a reverse cycle refrigeration system and more particularly to a four-way transfer valve for the same which functions to transfer the discharge and suction connections of the compressor to the two evaporator and/or condenser connections.

In accordance with an important feature of the present invention there is provided a hermetically sealed four-way valve which requires a minimum amount of operating current or energy and which is so constructed that there is a minimum amount of heat transfer between passageways of the valve for increased thermal efficiency. Briefly, this four-way valve incorporates a movable element within a hermetically sealed casing and such movable valve element is positioned in accordance with pressure differentials developed in the system, such pressure differentials being developed, for example, by a three-way solenoid-operated control valve.

A feature of the four-way transfer valve is that the operating element thereof requires no mechanical connections thereto other than the application of differential pressures thereto for effecting movement of the same between its two extreme positions in each of which such movable valve element is retained in operating position by friction or other static forces.

Another important feature of the present invention is that there is a minimum amount of heat transfer between various conduits in the four-way valve to minimize that heat transfer which otherwise would be a dead load on the refrigeration compression system so that in its broader aspects the present invention pertains to a more efficient refrigeration system.

Another object of the present invention is to provide an improved arrangement of this type characterized by its simplicity.

Another object of the present invention is to provide an improved system of this type in which the transfer valve does not require that the head pressure on the low and high sides be substantially equalized before the valve can be operated and, indeed, in accordance with an important feature of the present invention, such four-way valve may be operated using a small amount of energy.

Another object of the present invention is to provide an improved refrigeration system of this type which incorporates a piston-type four-way transfer valve which is controlled by a magnetically operated three-way valve.

Another object of the present invention broadly is to provide an improved reverse cycle refrigeration or defrost system. The term "reverse cycle refrigeration system" has reference to the fact that the evaporator and condenser units of the system may alternatively be used respectively as a condenser and evaporator unit.

Another object of the present invention is to provide an improved four-way transver valve of this character having a minimum number of parts which incorporate, in fact, only three cup packings which also serve as a means for effecting a heat insulation between various conduits of the valve.

Another object of the present invention is to provide an improved four-way valve of this character which requires the control of fluid to a single actuating piston to accomplish a two-position control.

Another object of the present invention is to provide an improved four-way transfer valve of this character in which the movable element tends to remain in that position to which it has been last operated.

Another object of the present invention is to provide an improved four-way transfer valve of this character so constructed as to prevent heat transfer between the hot compressor discharge gases and the cold suction return gases in either one of the two operation conditions of the reverse cycle refrigeration system in which such valve is connected.

Another object of the present invention is to provide an improved four-way transfer valve of this character characterized by the ease with which the high side pressure is maintained not just during the time the movable valve element is in its normal operating positions but also during the transient time when the movable valve element is moving between its normal operating positions, this being accomplished mainly by the provisions of cup packings on the movable element of the valve which covers one port before uncovering a second port.

Another object of the present invention is to provide an improved system of this character in which it is practically impossible to lose head pressure during the time the movable valve element of the four-way valve is moving or when it has reached its extreme operating positions.

Another object of the present invention is to provide an improved system of this character which may use either a single solenoid current failure type of pilot valve or a two-solenoid two-position non-current failure type of pilot valve for piloting the four-way transfer valve.

Another object of the present invention is to provide an improved four-way valve which permits high flow with low pressure loss.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 2 illustrates constructional features of the four-way transfer valve, the three-way pilot valve and the interconnections therebetween in the system illustrated in FIGURE 1.

FIGURE 3 illustrates a modified refrigeration system which also incorporates the structure illustrated in FIGURE 2.

FIGURES 4 and 5 illustrates modified four-way valves, each of which may be substituted in the system shown in FIGURE 1.

Figure 1:
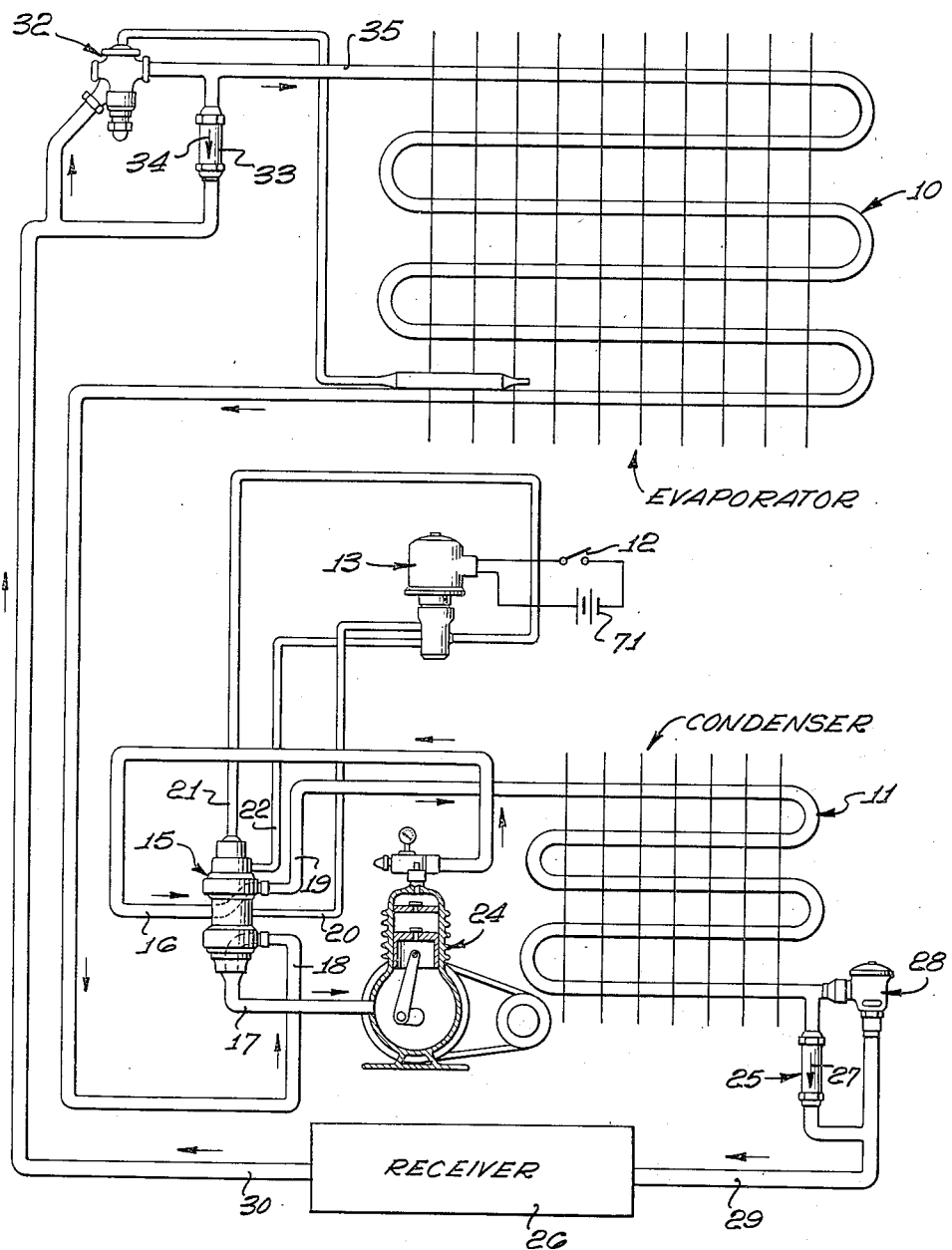
FIGURE 1 illustrates a reverse cycle refrigeration system embodying features of the present invention.

The system shown in FIGURE 1 is conditioned for its normal or forward operation in which the evaporator unit 10 functions as an evaporator and the condenser unit 11 operates as a condenser. This mode of operation corresponds to the condition wherein the control switch 12 controlling the three-way magnetic valve 13 is in its open position. When switch 12 is closed, reverse operation is accomplished, i.e. the unit 10 functions as a condenser and the unit 11 functions as an evaporator.

To achieve such reverse operation, there is provided a novel four-way transfer valve 15 incorporating important features of the present invention controlled also in a novel manner by the three-way magnetic valve 13, the details of which are more fully disclosed in FIGURE 2.

The four-way valve 15 has four main conduits connected or brazed thereto, these conduits being the compressor discharge conduit 16, the compressor suction conduit 17 and the conduits 18 and 19 which extend to one end of the units 10 and 11 respectively. Also, the four-way valve 15 has extending therefrom three conduits for control purposes, these being the conduits 20, 21 and 22 which are referred to respectively as a high pressure conduit, a common conduit and a suction conduit.

The conduit 16, as its name implies, is connected to the discharge side of the motor-driven compressor unit 24 having its suction conduit side connected to the compressor suction conduit 17. The conduit 19, receiving hot gases from the compressor as illustrated in FIGURE 1, is connected to one side of the condenser 11, the other side of the condenser 11 being connected through the bypass check valve 25 and conduit 29 to one side of the receiver unit 26, it being noted that the permissible direction of flow through the check valve is indicated by the arrow 27 and, as illustrated in FIGURE 1, such check valve 25 bypasses the expansion valve 28 which is effective in reverse operation, i.e. when the unit 11 functions as an evaporator instead of a condenser. The other side of the receiver 26 is connected by conduit 30 to one side of the expansion valve 32 and the discharge side of such valve 32 is connected through conduit 30 to one side of the unit 10, the other side of unit 10 being connected to the previously mentioned conduit 18. It is noted that the expansion valve 32 is in a branch circuit with the one-way check valve 33 having its permissible flow direction indicated by the arrow 34. Thus, as illustrated in FIGURE 1, only the expansion valve 32 is affected and the unit 10 receiving the refrigerant liquid therefrom functions as an evaporator.

The expansion valve 32 may be of the type manufactured by General Controls Co. and designated as its V-200 Thermostatic Expansion Valve and as indicated, may be provided with an external equalizer connection to provide smooth control substantially unaffected by coil pressure drop in the evaporator coil 10.

The four-way transfer valve 15 is a hermetically sealed unit using brazing or other like expedients in its assembly and is formed generally of tubular elements.

The valve 15 has a stationary outer valve casing comprising a tubular member 40 having an open-ended piston cylinder 41 brazed in its upper end and the compressor suction conduit 17 brazed in its lower end. This tubular member 40 has the conduits 16, 20 and 22 extending through different spaced portions of the wall thereof and likewise these are preferably hermetically secured by brazing or the like.

The tubular member 40 has a series of circumferentially arranged ports 45 in its upper portion and a like series of circumferentially spaced ports 46 therethrough in its lower end, these ports 45 being surrounded by an annular manifold 47 which receives conduit 19; and similarly, the ports 46 are surrounded by manifold 48 which flanged and brazed to the tubular member 40 to provide an annular space around such ports which are in communication with conduit 18.

The upper portion of piston cylinder 41 is in communication with conduit 21 and a movable piston 50 sealingly engages the inner wall of cylinder 41 using for that purpose a flanged ring 53 of elastic heat insulating material which may be adjustably squeezed against the adjacent cylinder wall by nut 54.

Piston 50 is secured to tubular valve element 56 by a hollowed web member 57 which allows the conduits 17 and 19 to be in communication with each other. For this purpose the web member 57, as illustrated in the drawings, is a part of the piston 50 and may be secured to the valve element 56 by brazing the lower end of member 57 to the adjacent outwardly flared end of tube 56D which forms a part of the valve element 56.

The tubular valve member 56 is of special construction to minimize heat transfer between the relatively hot and cold conduits of the valve and for this purpose engages the adjacent inner wall of tubular member 40 only through elastic heat insulating flanged ring-shaped seals 58 and 59 which are suitably retained at different spaced peripheral portions of the tubular member 56. Also, for the same purpose of minimizing heat transfer, the tubular member 56 is preferably fabricated in the following manner. A main tubular element 56A of metal is coated both internally and externally with a plastic or other heat-insulating material 56B and 56C and the internal plastic coating may be lined with thin metallic tube 56D.

It should be carefully noted that the diameters of the seals 53 and 59 are of substantially the same diameter, say, for example, 1 1/16" diameter, while the third seal, i.e. seal 58, has a larger diameter, for example, 1 5/16" diameter. These differences in diameter are of importance in effecting movement of the piston 50 and attached valve element 56 as described later.

It will be seen from this construction in FIGURE 2 that the valve element 56 is in one of its two extreme positions and abuts the internal ring 62 which serves as a stop but at the same time the movable valve element 56 is retained in that position by static forces such as frictional forces existing between it and housing 40 by virtue of the elastic seals 53, 58 and 59. The other permissible extreme position of the valve 56 corresponds to the condition when the piston engages the upper closed end of its cylinder 41.

It will also be seen from this construction that upon upward movement of the valve member 56, i.e. piston 50, the valve ports 46 are closed by seal 59 before the valve ports 45 are closed by seal 58; conversely, in downward movement of the piston 56, the ports 45 are closed by seal 58 before the ports 46 are closed by seal 59, and thus there the possibility of losing pressure head in transfer of the valve element 56 is minimized in conduit 20.

The three-way magnetically-operated valve 13 for effecting movement of piston 56 is now described. This valve 13 comprises a toroidal coil which is energizable by the D.C. source 71 through switch 12 for moving the associated magnetizable plunger 71 against its stop 72. The plunger 71 is normally biased downwardly from its attracted position by a coil compression spring 73 having one of its ends bearing against the stationary valve mounting ring 74 which has a threaded flange 75, the other end of spring 73 bearing against a flange on armature 71. An armature guide tube 76 is sealingly secured within ring 74 and has its upper end closed by stop 72 to prevent the escape of refrigerant introduced into the various valve ports now described.

A valve casing 78 is threaded on the flanged ring 74 and has formed therein two valve ports 80 and 81, the valve port 80 being arranged to be closed by gasket 82 recessed within the end of armature 71 and the port 81 being arranged to be closed by valve closure member 84 which is interconnected with armature 71 by a series of circumferentially spaced rods 85. A coil compression spring 86 has one of its ends bearing against the removable casing plug 87 and the other one of its ends bearing against the closure member 84 to assure closing of valve port 81 when coil 70 is energized. The spring 86 exerting a force in a direction opposite to that force developed by spring 73 serves to develop a force which partially counterbalances the force of spring 73 but is insufficient to prevent closing of valve 80, 82 when the coil 70 is de-energized.

The port 80 is always in communication with the pressure conduit 20 and port 81 is always in communication with suction conduit 22. The other common conduit 21 is in communication with the interconnected valve chambers 90 and 91 in valve casing 82. It will thus be seen that when solenoid valve 13 is energized as shown in FIGURE 2, the pressure conduit 20 is in communication with the common conduit 21 and piston chamber 41A through port 80 and chambers 91 and 90 and also at this time the so-called suction line 22 extending to the cylinder 40 is closed by valve 81, 84. When solenoid valve 13 is de-energized by opening switch 12, valve 80, 82 is allowed to close and valve 81, 84 is opened to thereby close the pressure line 20 and to intercommunicate the suction and common lines 22 and 21.

In explaining the operation of the system shown in FIGURES 1 and 2, it is assumed that initially the three-way valve 13 and four-way valve 15 are in their positions illustrated in FIGURE 2, resulting from prior closing of switch 12. In such case the unit 10 functions as a condenser and unit 11 functions as an evaporator with the high pressure gas or liquid from the compressor discharging into conduit 16 and through the open ports 46 to the unit 10 while the low pressure gas or liquid leaving unit 11 enters conduit 19, flows through ports 45 and through the heat-insulated tubular valve elements 56 to the suction side of the compressor through conduit 17. Also, at this time pressure is applied to the upper side of the actuating piston 50 through conduit 20, valve chambers 90, 91 and conduit 21. This pressure on the upper part of piston 50 develops a force downwardly in FIGURE 2 which overcomes the unbalanced force acting on the inside of seals 58, 59 to maintain the valve 56 in its actuated position shown in FIGURE 2. This unbalanced force has a resultant acting upwardly since, as mentioned previously, the area of seal 58 is greater than the area of seal 59 but such resultant force is overcome by the force acting downwardly on the top side of piston 50. Apart from this, the valve remains in its position illustrated in FIGURE 2 (assuming the absence of pressure) by static frictional forces developed between the three seals 53, 58 and 59 and their adjacent cylinder walls.

This condition in FIGURE 2 thus continues to exist until the switch 12 is opened which causes upward movement of the valve member 56 to its upper extreme condition to effect the conditions illustrated in FIGURE 1 wherein the functions of units 10 and 11 are interchanged. When switch 12 is opened, valve 80, 82 is closed and valve 81, 84 is opened to thereby prevent the application of pressure from conduit 20 and to place the conduits 22 and 21 in communication. As a result, the piston cylinder 41A is subjected to suction conditions existing in conduit 17 and the unbalanced pressure forces acting on valve member 56 (due to seal 58 being larger than seal 59) causes the valve member 56 to move upwardly to its upper extreme position. Here again, the valve member 56 is again maintained in its actuated position by not only pressure conditions in cylinder 41A but also by the static frictional forces developed between the three seals 53, 58, 59 and their adjacent cylinder walls.

To restore the system to the condition shown in FIGURE 2, the switch 12 is reclosed to apply pressure to the piston chamber 41A to move the valve member downwardly as mentioned previously.

In order to assure movement of the valve member to its extreme positions upon opening and closing switch 12, i.e. to avoid the valve member 56 stopping at an intermediate "dead center" position during its intended transition, the spacing between seals 58 and 59 is less than the axial spacing between the series of ports 46 on the one hand and the series of ports 45 on the other hand. Thus, as previously explained, in upward movement of valve member 56 the seal 56 closes the series of ports 46 before the series of ports 45 are closed by seal 58; and likewise, in downward movement of valve member 56 the seal 58 closes the port 45 before the port 46 is closed by seal 59. This assures the proper pressure conditions in piston cylinder 41 during all times during movement of valve member 56.

FIGURE 3 illustrates a modified system in which the same functions and results are accomplished using the same valves 13 and 15 and their interconnections as described above when connected as shown to heat exchange units 111 and 110 (similar to units 10 and 11) that are interconnected by capillary tubing 112.

FIGURE 4 illustrates a modified four-way valve structure also embodying features of the present invention and one which can be substituted for the four-way valve illustrated in FIGURES 1 and 2. To indicate the manner in which the substitution is made, the various conduits extending from the same carry the same reference numerals in FIGURES 2 and 4.

In FIGURE 4 there is provided a valve casing 240; the high pressure compressor discharge conduit is indicated at 16 leading into a central portion of the housing 240 and the conduits 19 and 18 are in communication with the interior of housing 240 through a corresponding series of circumferentially arranged ports 245 and 246 respectively. The manifold 247 surrounds ports 245 and manifold 248 surrounds ports 246 and such manifolds, of course, place corresponding ports in communication with corresponding conduits 19 and 18. The compressor suction connection in this instance comprises two conduits 17A and 17B which are interconnected to the compressor suction connection 17 through a T connection 17C.

The actuating piston 250 (corresponding to piston 50 in FIGURE 2) is slidably mounted in the cylinder chamber 241A defined by the cylinder 241. This cylinder 241 may be screw-threaded in the housing 240 or may be integral therewith as desired. The upper end of cylinder 241 is in communication with the so-called common connection 21 leading to the three-way valve through a valve 13 as indicated in FIGURE 2. The piston 250 carries a like cup-shaped elastic heat-insulating seal 253 which is only that portion of the piston that contacts the walls of cylinder 241. In like manner there are two cup-shaped seals 258 and 259 mounted on the rod 257 that interconnects the piston 250 and seals 258 and 259 so that all of these seals move jointly. Here again, the seal 258 is of larger area than either one of the seals 253 and 259 as such later seals are substantially of the same diameter. Also, as in FIGURE 2, the seals 258 and 259 are spaced closer than the spacing of the series of ports 245 on the one hand and the series of ports 246 on the other hand to assure non-loss of pressure in the transition of the valve member comprising seals 258, 259 when such valve member moves between extreme positions.

One of such extreme positions is shown in FIGURE 4 wherein the end of rod 260 abuts the closed bottom end of the housing 240. This rod 260, as shown, is threaded to the piston rod 257 for ease of fabrication and assembly and the seals 258 and 259 are fixedly mounted on the same using conventional means so as to accomplish a structure wherein these seals 258 and 259 of elastic and heat-insulated material are the only portions which engage the adjacent cylinder walls. The other extreme position of the valve member 258, 259 is its upper position wherein movement of the rod 257 is arrested by the upper end of the cylinder 241. As seen in FIGURE 4, in such extreme lower position the valve seals 258, 259 embrace the series of ports 246 so as to place the conduits 16 and 18 in communication; and in the other extreme position the seals 258 and 259 embrace the series of ports 245 to thereby place the conduits 16 and 19 in communication. In the lower position illustrated, the conduit 19 is in communication with the conduit 17 and in the above described upper position of the valve, the conduits 18 and 17 are in communication through through the conduit 17B. The pressure conduit 20 leading to the three-way valve, as illustrated at 13 in FIGURE 2, is always in communication with the conduit 16; and the suction conduit 22, corresponding to the identically numbered conduit 22 in FIGURE 2, is connected to the valve 13 in like manner.

It will thus be seen, in comparing the four-way valves in FIGURES 2 and 4, that the major difference between the same resides in the fact that in FIGURE 4 there are two suction conduits 17A and 17B leading to a common suction conduit 17 so that it then becomes unnecessary to conduct gases centrally through the entire length of the movable valve element as is the case in FIGURE 2.

FIGURE 5 illustrates another four-way valve structure also embodying features of the present invention and arranged for interconnection and substitution for the similar four-way valve 15 illustrated in FIGURE 2. Here again, for purposes of clearly indicating the manner in which the valve in FIGURE 5 may be substituted for the similar valve in FIGURE 2, the various interconnecting conduits have identical reference numerals as in FIGURE 2, there being provided the condenser discharge conduit 16, the compressor suction connection 17 leading through the T connection 17C to conduits 17A, 17B (as in FIGURE 4).

One radical change in FIGURE 5 is that the valve member having the spaced seals 358, 359, serves also the function of a piston, i.e., the function of the piston 50 in FIGURE 2 and the piston 250 in FIGURE 4. This piston member carrying the seals 358, 359 is in the form of a cylinder 341 having its bottom end closed with the seals 358 and 359 thereon serving as the only members which contact adjacent walls of the valve housing 340. Here again, the seal 358 is of larger diameter than the seal 359 but in this case the seal 353 is of slightly smaller diameter than seal 359. The expansible cylinder chamber 341A (corresponding to cylinder 41A in FIGURE 2) is thus defined by seal 353 and the lower closed end of cylinder 341. The conduit 21 is at all times in communication with this piston chamber 341A through the coil conduit 21A stationarily mounted within the stationary cylinder 21B having its lower closed end of reduced diameter and threaded to receive the nut 21C for retaining the seal 353. Here again, the spacing between the seals 358 and 359 is less than the distance between the series of apertures 345 on the one hand and the series of apertures 346 on the other hand.

The combined valve member and piston 341 is shown in its lower extreme position in FIGURE 5 wherein an extension 341A thereof abuts the lower closed end of chamber 340. It is observed that in such position the conduits 16 and 18 are in communication through ports 346 and the associated manifold 348 and that the other conduit 19 is in communication with the suction conduit 17 through the series of ports 345, manifold 347, conduit 17A and T connection 17C. In the other upper extreme position of the combined piston and valve member 341, the conduits 16 and 19 are intercommunicated through the ports 345 and the conduit 18 is then in communication with the suction conduit 17 through the series of ports 346, manifold 348, conduit 17B and the T connection 17C. The pressure conduit 20 is always in communication with the suction discharge conduit 16 and the suction connection 22 is made in the T connection 17C. These conduits 20, 21 and 22 are connected to a three-way valve by like numbered conduits illustrated in FIGURE 2. It will be observed that by using a construction in which the functions of the piston and valve member are combined as is the case in the construction of the piston and valve member 341 in FIGURE 5, the three-way valve member may be made relatively small.

While the systems shown in FIGURES 1 and 2 disclose a specific form of three-way valve, other forms of three-way valves may be used such as, for example, the valve described and claimed in the patent of William A. Ray, No. 2,886,063, issued May 12, 1959. The four-way valve 15 in FIGURES 1, 2 and 3 and the modifications thereof illustrated in FIGURES 4 and 5 may be piloted by means other than a three-way valve. For example, a four-way non-current failure type of pilot valve could be used for that purpose. For example, a two-solenoid two-position non-current failure type of pilot valve could be used for piloting the four-way valve. Such a pilot valve would have some obvious advantages such as requiring a momentary contact only instead of the steady use of current or maintenance of a continuously closed circuit, and elimination of the necessity of returning the main pilot valve, for example, on every operation of the heating side of the cycle should such pilot valve be connected in parallel with or connected concurrently with the compressor.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A four-way transfer valve comprising a valve casing, a first and second series of circumferentially arranged valve ports in said casing with said first and second series being spaced from each other, separate manifold means surrounding each of said series of ports and each manifold means being in communication with a first and second conduit, a movable valve member in said casing and carrying a pair of spaced seals each engaging adjacent inner portions of said valve casing, one of said pair of seals having a diameter greater than the other of said pair, said pair of seals defining an annular space with the inner wall of said casing, said annular space being in communication with a third conduit, the spacing of said pair of seals being smaller than the spacing between the said first and second series of ports and said valve member being moveable in said casing to alternately place either said first and third conduits in communication through said annular space or said second and third conduits through said annular space, said valve incorporating means for moving said valve member, said means comprising expansible chamber means to which a fluid pressure may be applied for moving said valve member, and fourth conduit means in communication with said first conduit when said second and third conduits are intercommunicated by said annular space, said fourth conduit means being in communication with said second conduit when said first and third conduits are in communication through said annular space.

2. A valve as set forth in claim 1 in which said expansible chamber means comprises a piston slidably mounted in said chamber and being attached to said valve means, a seal on said piston engaging an adjacent wall of said housing and having a diameter less than the diameter of said one of said pair of seals.

3. A valve as set forth in claim 2 in which said movable valve member comprises a tubular member open at opposite ends which is always in communication with said fourth conduit means, said fourth conduit means comprising a single conduit.

4. A valve as set forth in claim 2 in which said expansible chamber means comprises a piston slidably mounted in said casing with a seal thereon having a diameter less than the diameter of said one of said pair of seals, said piston being attached to said valve member.

5. A valve as set forth in claim 2 in which said valve member comprises a closed-ended tube in which a stationary piston is mounted, said stationary piston and said closed-ended tube serving as said expansible chamber means for moving said valve member.

6. A refrigeration system incorporating the valve of claim 1, said system comprising a pair of heat exchangers effectively connected in series for either forward or reverse flow of a heat exchange material therethrough, one end of one of said heat exchangers being connected to said first conduit, the other of said heat exchangers being connected to said second conduit, a compressor connected to cause said material to flow through said changers and having its discharge side connected to said third conduit and its suction side connected to said fourth conduit means, pilot means comprising a fifth conduit in communication with said third conduit, a sixth conduit in communication with said expansible chamber means, and a seventh conduit in communication with said fourth conduit means, said pilot means incorporating means whereby either said fifth and sixth conduits are intercommunicated or alternatively said sixth and seventh conduits are intercommunicated.

7. A four-way valve comprising a generally tubular valve casing having a first series and a second series of valve ports therein, said first and second series being spaced along the longitudinal axis of said tubular valve casing, a valve member slidably mounted in said casing and having a pair of spaced seals thereon which define an annular chamber with the adjacent casing wall, one of said seals having a diameter larger than the other of said seals, and said seal being spaced closer than the longitudinal spacing of said valve ports, and hydraulic means for moving said valve member to alternatively place said annular space in communication with said first series of ports or said second series of ports.

8. A valve as set forth in claim 7 in which said means for moving said valve member comprises a piston movable in a chamber defined by said casing, and said piston being attached to said valve member, said piston having a diameter less than the diameter of said one seal.

9. A valve as set forth in claim 7 in which said means for moving said valve member comprises an expansible chamber, said expansible chamber comprising a relatively fixed piston on which said valve member is slidable.

10. In a refrigeration system wherein it is desired to supply refrigerant fluid from a compressor unit to a pair of heat exchange units in either a forward or reverse direction to effect either a heating or a cooling operation and wherein a four-way valve is incorporated to reverse the compressor discharge and suction connections with respect to said heat exchange units, said four-way valve comprising a generally tubular valve casing having a first series of circumferentially arranged ports in communication with one of said heat exchange units, said casing having a second series of circumferentially arranged ports in communication with the other of said pair of heat exchange units, a valve member slidably mounted in said casing and carrying a pair of spaced seals, one of said seals being of larger diameter than the other of said pair of seals, the spacing between said seals being less than the spacing between said first and second series of ports, said seals defining an annular chamber which is in communication with the discharge side of said compressor, said valve chamber having conduit means in communication with the ends of said valve member, and means responsive to pressure differentials in said system for moving said valve member to either intercommunicate said annular space with said first series of ports and to intercommunicate said conduit means with said other series of ports or to intercommunicate said annular space with said other series of ports and to intercommunicate said one series of ports with said conduit means.

11. A system as set forth in claim 10 in which said means responsive to pressure differentials comprises a piston movable in said valve casing and attached to said valve member, and means for alternatively placing said chamber in communication with the suction side of said compressor or the discharge side of said compressor.

12. A system as set forth in claim 10 in which said means responsive to pressure differentials comprises an expansible chamber defined by a piston member mounted on said casing which extends into a closed-ended tubular member defining said movable valve member.

13. A system as set forth in claim 10 in which said valve member comprises an open-ended tube with the interior portion thereof always in communication with said conduit means extending to the suction side of said compressor.

14. A four-way valve for a system of the character described comprising a valve casing having first port means therein and second port means spaced from said first port means, a valve member slidably mounted in said casing and carrying a pair of seals which define an annular space therebetween, said seals being of heat insulating material and being the sole means whereby said valve member engages said casing, first conduit means always in communication with said annular space, means responsive to pressure differentials in the system for moving said valve member to alternatively place said annular space in communication either with said first port means or said second port means, and conduit means always in communication with opposite ends of said valve member.

References Cited in the file of this patent

UNITED STATES PATENTS

| | | |
|---|---|---|
| 2,638,123 | Vargo | May 12, 1953 |
| 2,714,394 | Moran | Aug. 2, 1955 |
| 2,724,246 | Lowe | Nov. 22, 1955 |
| 2,753,692 | Dickieson | July 10, 1956 |
| 2,765,628 | Anthony | Oct. 9, 1956 |